United States Patent
Walter et al.

(10) Patent No.: US 10,046,425 B2
(45) Date of Patent: Aug. 14, 2018

(54) METHOD FOR ASSEMBLING AN ENGINE MODULE

(75) Inventors: Michael Walter, Ilsenburg (DE);
Marian Schulze, Wernigerode (DE);
Sven Sitte, Wernigerode (DE)

(73) Assignee: Thyssenkrupp Presta TecCenter AG, Eschen (LI)

( * ) Notice: Subject to any disclaimer, the term of this patent is extended or adjusted under 35 U.S.C. 154(b) by 665 days.

(21) Appl. No.: 13/821,265

(22) PCT Filed: Sep. 9, 2011

(86) PCT No.: PCT/EP2011/004548
§ 371 (c)(1),
(2), (4) Date: Jul. 19, 2013

(87) PCT Pub. No.: WO2012/031770
PCT Pub. Date: Mar. 15, 2012

(65) Prior Publication Data
US 2013/0283613 A1    Oct. 31, 2013

(30) Foreign Application Priority Data

Sep. 10, 2010   (DE) .................... 10 2010 045 047

(51) Int. Cl.
*B23P 19/04* (2006.01)
*B21D 53/84* (2006.01)
(Continued)

(52) U.S. Cl.
CPC ............ *B23P 19/04* (2013.01); *B21D 53/845* (2013.01); *B23P 11/025* (2013.01); *F01L 1/047* (2013.01);
(Continued)

(58) Field of Classification Search
CPC ..... B23P 19/04; B23P 2700/02; B23P 11/025; F16H 53/025; F02F 7/006; B21D 53/845;
(Continued)

(56) References Cited

U.S. PATENT DOCUMENTS 3,672,338 A * 6/1972 Yamanouchi ........... F01L 1/053
123/90.27
6,473,964 B1 * 11/2002 Anderson ............... B22F 7/062
29/447

(Continued)

FOREIGN PATENT DOCUMENTS

CN    101307701 A    11/2008
CN    101555810 A    10/2009
(Continued)

OTHER PUBLICATIONS

International Search Report with English translation dated Feb. 28, 2012 (six (6) pages).

*Primary Examiner* — Jacob Cigna
*Assistant Examiner* — Lee A Holly
(74) *Attorney, Agent, or Firm* — Crowell & Moring LLP (57) ABSTRACT

A method for assembling a module for a motor vehicle engine in which the components, such as e.g. cams, sensor wheels etc., which are to be attached to the support shaft, are positioned, prior to insertion of the support shaft, merely at those axial positions that do not correspond to the axial positions occupied by these components on the fully constructed camshaft.

7 Claims, 7 Drawing Sheets

(51) Int. Cl.
*B23P 11/02* (2006.01)
*F01L 1/047* (2006.01)
*F02F 7/00* (2006.01)
*F16H 53/02* (2006.01)
*F01L 1/053* (2006.01)

(52) U.S. Cl.
CPC ........... *F02F 7/006* (2013.01); *F16H 53/025* (2013.01); *B23P 2700/02* (2013.01); *F01L 1/053* (2013.01); *F01L 2001/0476* (2013.01); *Y10T 29/4927* (2015.01)

(58) Field of Classification Search
CPC ... F01L 1/047; F01L 2001/0476; F01L 1/053; Y10T 29/4927
See application file for complete search history.

(56) References Cited

U.S. PATENT DOCUMENTS

| | | | |
|---|---|---|---|
| 7,434,572 B2 * | 10/2008 | Hutter et al. | 123/572 |
| 8,757,117 B2 * | 6/2014 | Schaefer et al. | 123/90.18 |
| 2002/0096014 A1 * | 7/2002 | Leuthold | F16D 1/072 74/567 |
| 2004/0134063 A1 * | 7/2004 | Vogel | 29/888.1 |
| 2006/0005385 A1 * | 1/2006 | Quaas | 29/888.08 |
| 2006/0064872 A1 * | 3/2006 | Shirai | B21D 53/84 29/888.1 |
| 2008/0250895 A1 | 10/2008 | Yamamoto et al. | |
| 2008/0257290 A1 * | 10/2008 | Lettmann et al. | 123/90.17 |
| 2008/0276888 A1 * | 11/2008 | Muster | 123/90.6 |
| 2010/0059002 A1 | 3/2010 | Drouillard | |

FOREIGN PATENT DOCUMENTS

| | | | | |
|---|---|---|---|---|
| DE | 20 2006 018 359 U1 | 3/2007 | | |
| EP | 0462081 A1 * | 12/1991 | | B23P 19/02 |
| EP | 1 155 770 B1 | 8/2004 | | |
| EP | 1 936 131 A1 | 6/2008 | | |
| GB | 2 290 599 A | 1/1996 | | |
| GB | 2 456 792 A | 7/2009 | | |
| WO | WO 2010097295 A1 * | 9/2010 | | |

* cited by examiner

METHOD FOR ASSEMBLING AN ENGINE MODULE

BACKGROUND AND SUMMARY OF THE INVENTION

Exemplary embodiments of the present invention relate to a method for assembling an engine module for a motor vehicle engine, which comprises a cylinder head cover and a camshaft rotatably mounted in the cylinder head cover.

In order to reduce assembly outlay when assembling a motor vehicle engine and to reduce storage and logistics costs in engine assembly, engine modules that are already fully assembled are supplied directly to the assembly line of automotive manufacturers by suppliers. Such engine modules consist of, for example, a cylinder head cover and a camshaft mounted therein. In the context of engine assembly, only this module then has to be attached to the cylinder head of the engine.

European Patent Publication No. EP 1 155 770 B1 describes a method for assembling an engine module consisting of a cylinder head cover and a camshaft mounted therein. A cylinder head cover is provided having lead-throughs, through which the cylindrical support shaft of the subsequent camshaft is inserted. The components, such as e.g. the cams, which are to be attached to the camshaft must be disposed in specific receptacles such that they are positioned precisely in the required angular orientation and at the required axial position. If the cylinder head cover and the components to be attached to the support shaft with their lead-throughs for receiving the support shaft are aligned with respect to each other at the correct position and angle, then the support shaft is pushed through the lead-throughs. In accordance with one embodiment of the method described in EP 1 155 770 B1, the components to be attached to the support shaft are heated before the support shaft is pushed through, and the support shaft is cooled in order to ensure force-free insertion of the support shaft. The cams are attached to the support shaft by means of a press-fit connection. EP 1 155 770 B1 describes various ways of producing this press-fit connection. The press-fit connection can be produced by virtue of the fact that the support shaft is inserted by means of a press by the application of force. Another way of producing the press-fit connection resides in the fact that the inserted support shaft is subjected to hydroforming so that the outer diameter of the shaft is widened consecutively or simultaneously at least in the region of the components.

The method disclosed in EP 1 155 770 B1 is complex and associated with high costs because the components that are to be attached to the support shaft have to be precisely positioned and aligned, even before insertion of the support shaft, in the manner how they are to be disposed on the subsequent camshaft. In order to achieve this, specifically designed and formed holding elements are required, into which the components can be inserted at the correct position and angle. For each component, the holding element must have a specifically formed holding receptacle. The production of these holding elements is complex and expensive. Moreover, different holding elements are required for different camshafts. The reason for this is the angular alignment of the cams relative to the support tube of the camshaft is, for example, dependent upon whether it is a camshaft for a 4-cylinder engine or a 6-cylinder engine.

Exemplary embodiments of the present invention are directed to a method for assembling an engine module consisting of a cylinder head cover and a camshaft, in which no specifically designed devices are required for holding and arranging the components, which are to be attached to the support shaft, in the correct angular position in each case, and which can be used in a flexible manner for different camshafts which have cams with different angular positions.

A significant advantage of the method in accordance with the invention resides in the fact that the components, such as e.g. cams, sensor wheels etc., which are to be attached to the support shaft, are positioned, prior to insertion of the support shaft, merely at those axial positions that do not correspond to the axial positions occupied by these components on the fully constructed camshaft. Therefore, the components do not need to be precisely aligned with regard to their angular position relative to the support shaft. In the case of the method in accordance with the invention, precise alignment of the components prior to insertion of the support shaft can be completely omitted. Therefore, no specific holding devices are required which, even before insertion of the support shaft, serve to fix the precise angular position of the individual components, which are to be attached to the support shaft, relative to the support shaft.

In accordance with the present invention, after insertion of the support shaft the components are attached thereto by virtue of the fact that either the components are pressed onto the widened-diameter portions of the support shaft allocated thereto or the widened-diameter portions allocated to the components are pressed into the lead-through openings of the components. The respective angular position of each individual component relative to the support shaft can be conveniently adjusted by virtue of the fact that the support shaft is rotated relative to the respective component about a specific angle, so that the required relative angular position of the component with respect to the support shaft is achieved. Therefore, the method in accordance with the invention can be used to construct different modules with completely different camshafts, without a specific holding device being required in each case for each different camshaft, in order to ensure the correct positioning and alignment of the cams on the support shaft. Therefore, by means of the method in accordance with the invention, it is possible in a cost-effective and convenient manner to manufacture, for different engines or engine variants, modules having different camshafts, in which the components to be attached to the camshaft are disposed in different angular positions relative to the support shaft.

In accordance with one embodiment of the invention, the widened-diameter portions are introduced into the support shaft by means of a mechanical forming method, such as e.g. roller-burnishing.

In accordance with the invention, the bearing receptacles of the cylinder head cover and the bearing portions of the support shaft are dimensioned such that, when the cylinder head cover is in the fully mounted state, the bearing receptacles together with the bearing portions form sliding bearings. The bearing portions of the support shaft can be ground to size such that, in the cooled state, the support shaft has the slightly smaller diameter-required for formation of a sliding bearing—than the bearing receptacle of the cylinder head cover.

BRIEF DESCRIPTION OF THE DRAWING FIGURES

The invention will be explained in greater detail hereinafter with reference to schematic drawings illustrating the principle of the invention. In the drawings.

DETAILED DESCRIPTION

Figure 1:
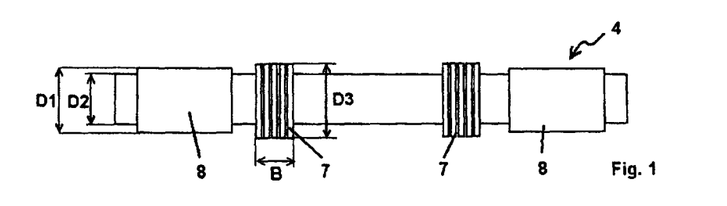
FIG. 1 shows a support shaft prepared for the method in accordance with the invention.

FIG. 1 illustrates a support shaft 4 prepared for use in the method in accordance with the invention. The support shaft 4 has a plurality of portions having different diameters. The diameters designated by the reference D1 form the bearing portions 8 of the support shaft 4 which, in the fully assembled state of the module, form with the bearing receptacles 2 of the cylinder head cover 1 sliding bearings for the camshaft 3. The reference D2 designates the diameter, on which the components 5 to be attached to the support shaft are pre-positioned before a fixed connection to the support shaft 4 is established. The reference D3 designates the outer diameter of the widened-diameter portions 7. In the illustrated exemplified embodiment, two different ways of forming the widened-diameter portions 7 are described. The widened-diameter portion 7 illustrated on the left in FIG. 1 has been produced by a roller-burnishing procedure. Its width B is tailored to the component to be attached to the widened-diameter portion 7.

In contrast, the widened-diameter portion 7 illustrated on the right in FIG. 1 has been produced by means of a grinding process, i.e., the support shaft 4 has been ground starting from a larger diameter to the diameter D3. However, the exemplary embodiments of the invention that are illustrated hereinafter illustrate only widened-diameter portions produced by roller-burnishing.

Figure 2:
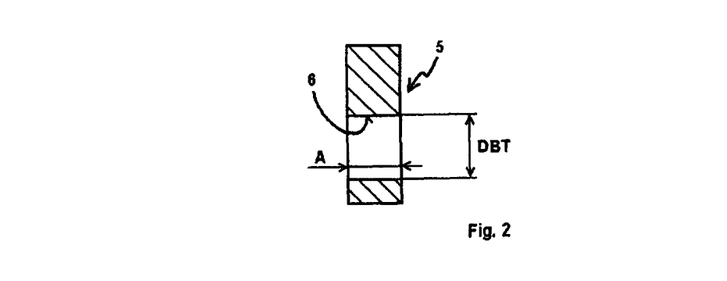
FIG. 2 shows a component in the form of a cam that is to be attached to the support shaft during assembly of the module.

FIG. 2 shows a component 5 at ambient temperature that is to be attached to the support shaft 4 in the course of assembling the module. The component illustrated by way of example in FIG. 2 is a cam having a through-opening 6 with a diameter DBT and a width A. However, the method in accordance with the invention can be used to attach not only cams but also other components, such as e.g. sensor wheels and the like, in the correct position to the support shaft 4. For the sake of simplicity, a specific exemplary embodiment of the invention will be described in connection with an example of cams as the components to be attached to the support shaft.

Figure 3:
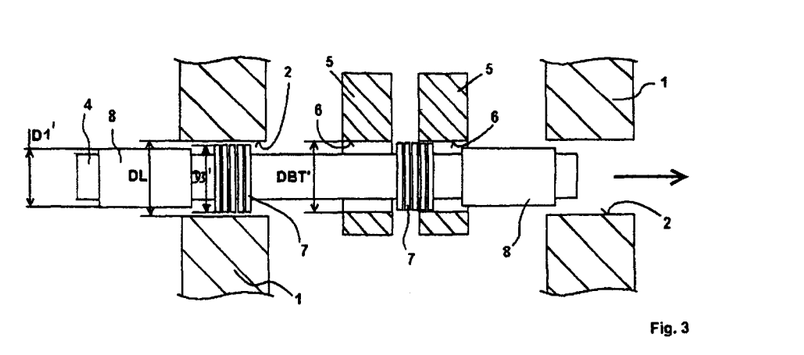
FIG. 3 shows a schematic illustration of the method step, in which the cooled support shaft is pushed through the bearing receptacles of the cylinder head cover and the heated components which are to be attached to the support shaft.

FIG. 3 illustrates the method step of pushing the cooled support shaft 4 through the bearing receptacles 2 of the cylinder head cover 1 and the through-openings 6 of the heated components 5. The illustration is purely schematic and for ease of understanding no further parts or details of the cylinder head cover 1 are illustrated. The outer diameter of the bearing portions 8, which is reduced due to the cooling of the support shaft 4, is designated by the reference D1' and the reduced diameter of the widened-diameter portions 7 is designated by the reference D3' the diameter of the component through-openings 6 that is increased by reason of the heating of the components 5 is designated by the reference DBT'. Furthermore, the diameter of the bearing receptacles 2 of the cylinder head cover 1 is designated by the reference DL.

The diameters D1 of the bearing receptacles 8 and D3 of the widened-diameter portions 7 and the diameter DBT of the through-openings 6 of the components 5 have been dimensioned within the scope of the production of the respective components such that the diameters D1' and D3' of the cooled support shaft 4 are slightly smaller than the diameter DL of the bearing receptacles 2 and the diameters DBT' of the heated components 5. In this manner, the support shaft 4 can be simply be pushed through the bearing receptacles 2 and the through-openings 6.

The components 5 are positioned relative to the cylinder head cover 1, without having to consider the angular orientation of the components with respect to the support shaft 4. The through-openings 6 are aligned such that they are flush with the bearing receptacles 2 of the cylinder head cover 1. The components 5 can be heated before or after positioning. A suitable heating method is heating by means of induction. The support shaft 4 can be cooled e.g. with liquid nitrogen or another cooling agent.

Figure 4:
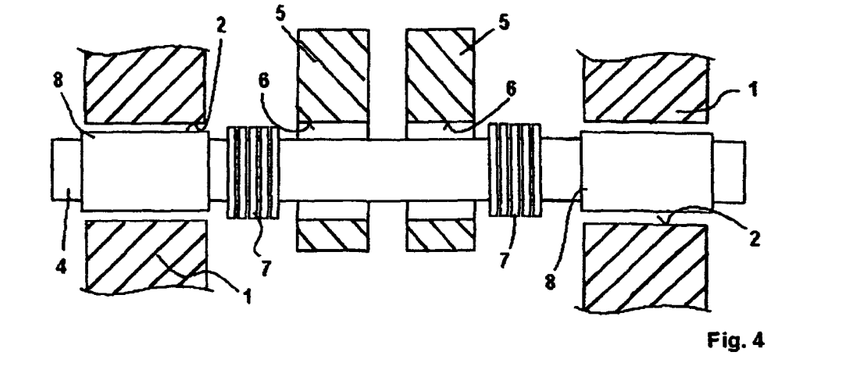
FIG. 4 shows a schematic illustration of the module-forming components with a cooled support shaft and heated components, wherein the support shaft has reached its position.
Figure 5:
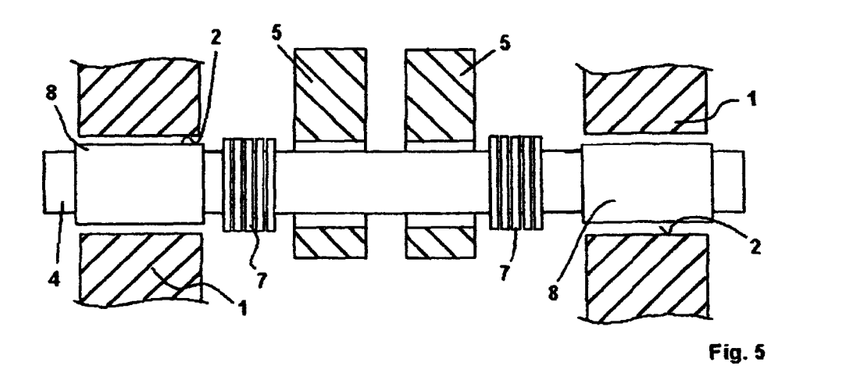
FIG. 5 shows the schematic illustration of FIG. 4 after temperature equalization has been effected, i.e., with the support shaft heated to ambient temperature and with components cooled to ambient temperature.

FIG. 4 shows the fully inserted state of the support shaft 4 when the support shaft 4 is still cooled and the components 5 are still heated. Starting from this state, the support shaft 4 is then heated and the components 5 are cooled until both components have assumed ambient temperature. This state after temperature equalization has been effected is illustrated in FIG. 5. In this state, the components 5 are pre-positioned on a portion with the diameter D2. The diameter DBT of the through-openings 6 is slightly larger than the diameter D2, so that the relative angular position of the components 5 with respect to the support shaft 4 varies freely by simple rotation of the support shaft 4 and can be adjusted in any desired manner.

Figure 6:
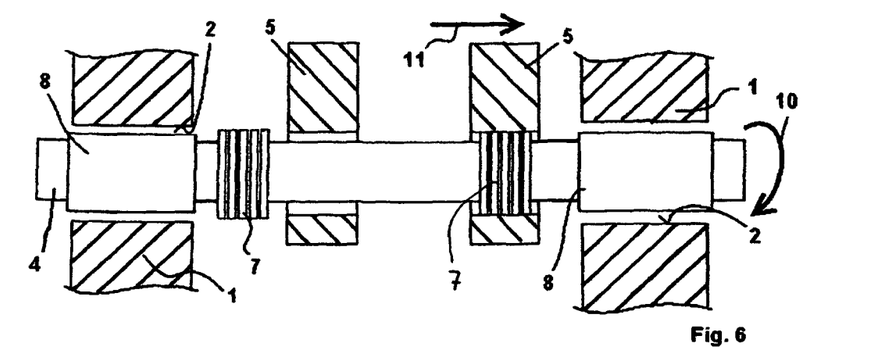
FIG. 6 shows a schematic illustration of the joining process, by means of which a first component is attached to the support shaft.
Figure 7:
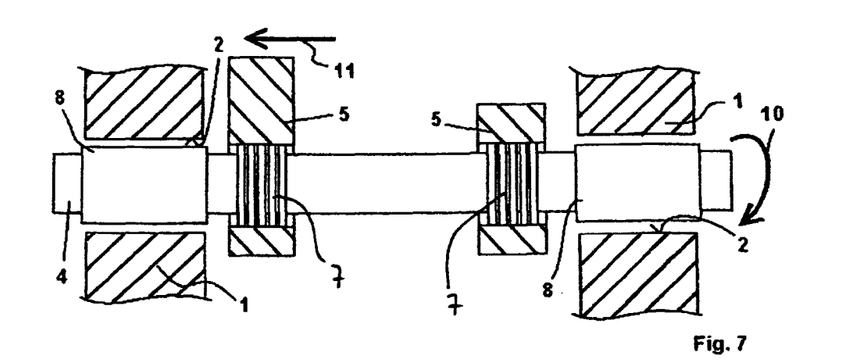
FIG. 7 shows a schematic illustration of the joining process, by means of which a second component is attached to the support shaft.

FIG. 6 schematically illustrates how a first component 5 is attached to the support shaft 4 by pressing it onto the widened-diameter portion 7. Before the component 5 is pressed onto the widened-diameter portion 7, the desired angular position of the component 5 relative to the support shaft 4 is adjusted by rotation of the support shaft 4. This is indicated in FIG. 6 by the arrow 10. The arrow 11 indicates the direction in which the component 5 is pressed on. The attaching procedure for the second component 5 is illustrated in a similar manner in FIG. 7. In this case, the desired angular position of the component 5 relative to the support shaft 4 is also adjusted in a very simple manner by simple rotation of the support shaft 4.

It is understood that further components can be attached in this manner to the support shaft 4. Therefore, by means of the method in accordance with the invention, it is possible in a simple and cost-effective manner using one and the same device and one and the same procedure to manufacture different modules consisting of the cylinder head cover and the camshaft, e.g. a module having a camshaft for a 4-cylinder engine and a module having a camshaft for a 6-cylinder or 8-cylinder engine. The method in accordance with the invention thus also increases the manufacturing flexibility because different modules can be assembled consecutively without any complex modifications of the assembly device.

Figure 8:
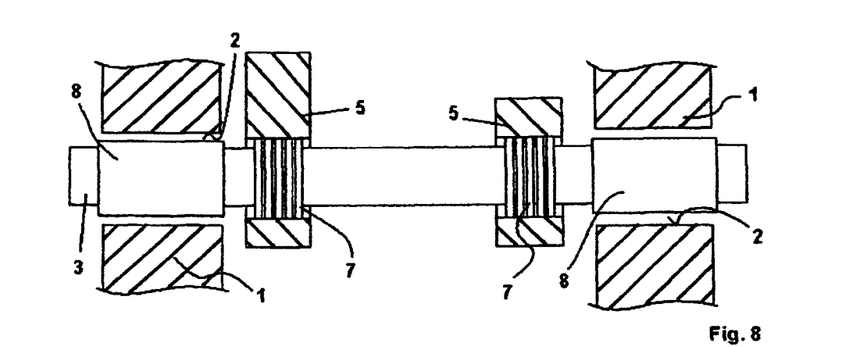
FIG. 8 shows a schematic illustration of the fully joined module.

Finally, FIG. 8 schematically illustrates the fully assembled module. The components 5 are connected to the support shaft 4 in a non-positive-locking and positive-locking manner. The bearing portions 8 together with the bearing receptacles 2 of the cylinder head cover 1 form sliding bearings.

In accordance with one embodiment of the method in accordance with the invention, the components 5 to be connected to the support shaft 4, during implementation of the method step in which they are positioned in a predetermined sequence relative to the support shaft 4 such that their through-openings 6 are disposed in a flush manner with respect to the bearing receptacles 2 of the cylinder head cover 1 and are positioned at axial positions that do not correspond to the axial positions occupied by these components 5 on the fully constructed camshaft 3, are additionally also positioned such that after the temperature equalization between the support shaft 4 and the components 5, which is achieved by heating of the support shaft 4 and/or cooling of the components 5, they are held in a releasably fixed manner on a partial portion of the widened-diameter portions 7 respectively allocated to them. In this manner, it is possible to fix the components 5 in a specific desired relative position with respect to the support shaft 4 in a releasable manner on the support shaft. If the components 5 are formed, for example by cams, all of the cams 5 can be fixed in a releasable manner on the support shaft 4 such that their cam lobes point in the same direction. The advantage of this approach resides in the fact that the press-fit connection between the cams 5 and the support shaft 4 that is to be performed after positioning of the cams can be effected in a simple manner in an automated method step. Within the scope of automated production of the press-fit connection between the components/cams 5 and the support shaft 4 with the aid of a press-on device or press-in device, it is advantageous if the relative position of the components/cams 5 is fixedly specified. The device then does not require any means to ascertain the actual relative position of each component/cam 5 in the peripheral direction before the required angular position of the component/cam 5 on the support shaft 4 is adjusted by rotation of the support shaft relative to the component/cam 5.

In other words, if the relative angular position of the components/cams 5 with respect to the support shaft 4 after positioning thereof and prior to the establishment of the press-fit connection is not previously known by fixing the components/cams 5 temporarily on the support shaft 4, then prior to the establishment of the press-fit connection the relative angular position of the components/cams 5 must first be ascertained before it is possible to determine the angle through which the support shaft 4 must be rotated in order to ensure a desired angular position of the component/cam 5 on the support shaft 4. This makes it more difficult to automate the procedure of pressing the components/cams 5 onto the support shaft 4 or pressing the support shaft 4 into the components/cams 5. If, however, after positioning, the components/cams 5 are still releasably fixed on the support shaft 4 in the same angular position, the working step of ascertaining the relative angular position of the components/cams 5 relative to the support shaft 4 can be omitted because the relative angular position is previously known. The device for establishing the press-fit connection between the components/cams 5 and the support shaft 4 can thus be configured in a substantially simpler manner and the method in accordance with the invention for assembling the camshaft can be performed more rapidly. The cycle time is increased considerably and a more economic operation of the manufacturing plant is achieved.

Figure 9:
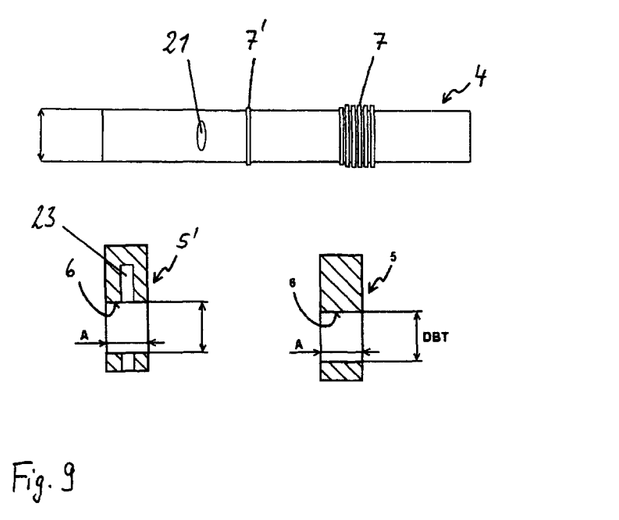
FIG. 9 shows a schematic illustration of a hollow support shaft for an adjustable camshaft having two different components 5 and 5', of which only the component 5 is connected in a rotationally fixed manner to the support shaft.
Figure 10A:
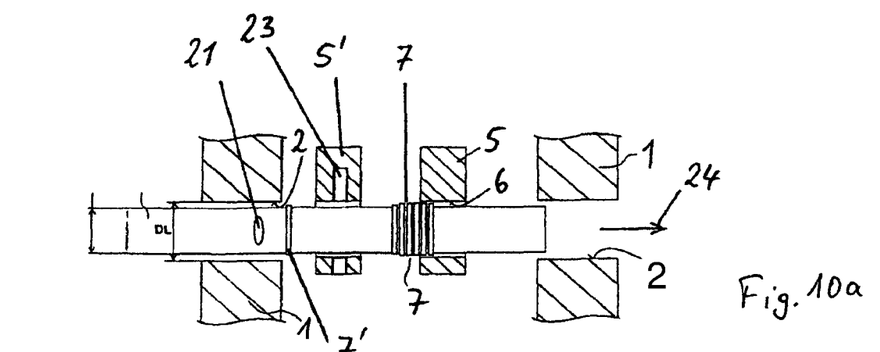
FIGS. 10a-10d show the method step sequence in the production of an adjustable camshaft having two different components 5 and 5' in accordance with FIG. 9.
Figure 10B:
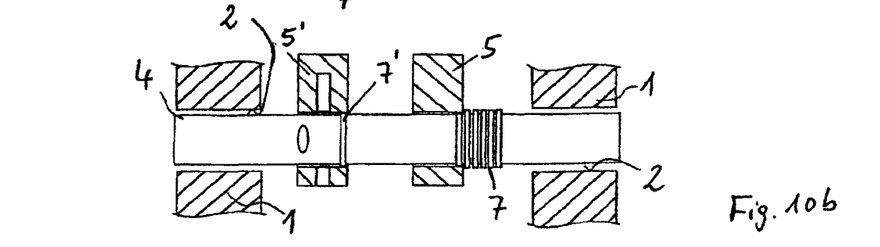
Figure 10C:
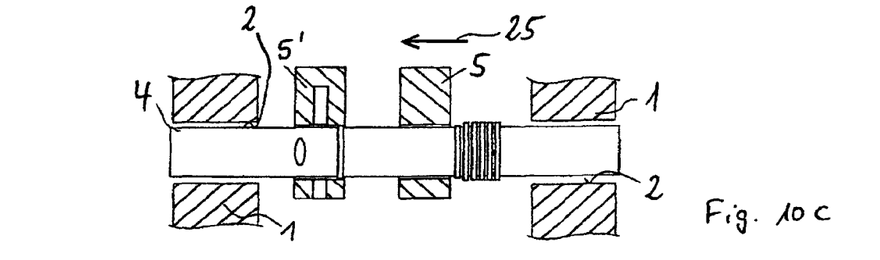
Figure 10D:
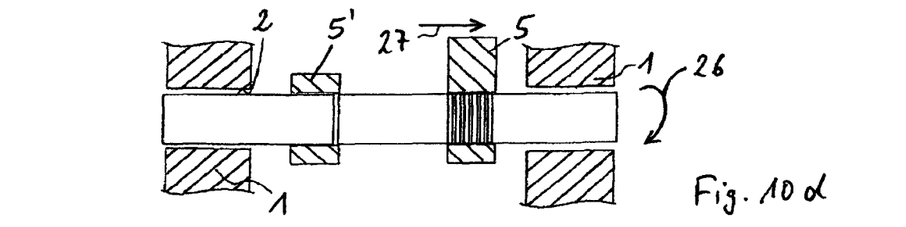
Figure 11:
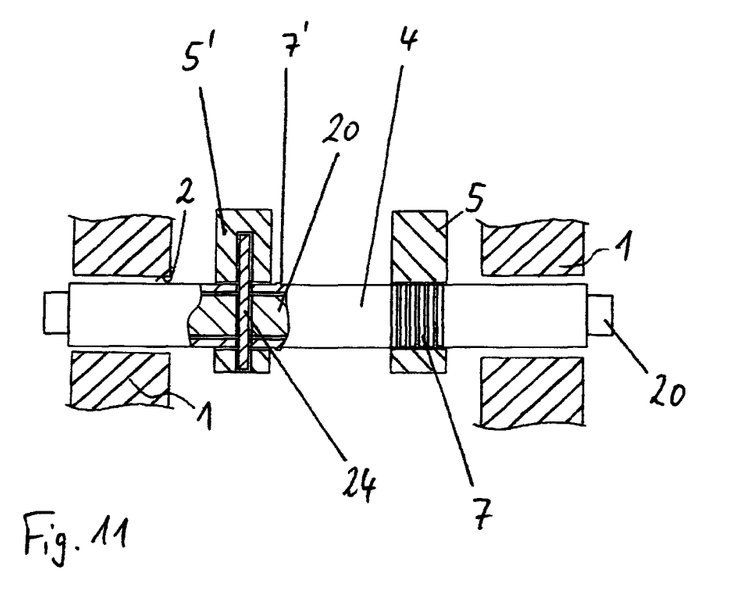
FIG. 11 shows an assembled, adjustable camshaft having a hollow shaft and an inner shaft which is disposed concentrically therein and can be rotated relative to the support shaft.

FIGS. 9 to 11 show an embodiment, in which the method in accordance with the invention is utilized within the framework of the assembly of an adjustable camshaft. In the case of this embodiment, the support shaft 4 is formed as a hollow shaft. In the interior of the support shaft 4, an inner shaft 20 is disposed concentrically with respect to the support shaft 4, wherein the inner shaft 20 can be rotated relative to the support shaft 4. Components 5 are connected to the support shaft 4 by means of a press-fit connection in the manner described above. In addition to the components 5, at least one further component 5' is provided which is not connected to the support shaft 4 but which is connected to the inner shaft 20 in a rotationally fixed manner. The rotationally fixed connection of the component 5' to the inner shaft 20 is established e.g. by means of a pin connection, as will be explained in greater detail below. In this manner, the components 5' can be rotated together with the inner shaft 20 relative to the support shaft 4 and the components 5 that are fixedly connected to the support shaft 4.

The components 5 and 5' are preferably formed by cams, by means of which the gas exchange valves of an internal combustion engine are actuated. A relative rotation of the inner shaft 20 with respect to the support shaft 4 ensures that the opening and closing times of the valves actuated by the cams 5' are changed.

In this manner, an adjustable camshaft is provided that has been produced using the method in accordance with the invention.

The support shaft 4 illustrated in FIG. 9 is formed as a hollow shaft. In the interior of the support shaft 4, an inner shaft 20 is disposed concentrically with respect to the support shaft (cf. FIG. 11). The inner shaft 20 can be rotated relative to the support shaft 4. The support shaft 4 illustrated in FIG. 9 has two different widened-diameter portions 7, 7'. The first widened-diameter portion 7 serves to form a press-fit connection with the component 5 in the manner described above. The second widened-diameter portion 7' serves to fix the component 5' in a releasable manner on the support shaft 4, as will be described in greater detail below. Furthermore, the support shaft 4 has an opening 21. The component 5' which in the illustrated exemplified embodiment is formed as a cam has a bore 23. The inner shaft 20 that is to be disposed in the hollow support shaft 4 (cf. FIG. 11) is not illustrated in FIG. 9. The opening 21 and the bore 23 serve to attach the component 5' to the inner shaft 20 in a rotationally fixed manner. This will be explained below with reference to FIG. 11.

FIGS. 10a-10d illustrate the production method in accordance with the invention using the example of the assembly of an adjustable camshaft. FIG. 10a shows the threading of the support shaft 4 into the mutually flush bearing receptacles 2 and through-openings 6. The support shaft 4 has been cooled, so that its diameter is reduced and the support shaft together with the widened-diameter portions 7, 7' can be pushed through the through-openings 6. The arrow 24 shows the threading-in direction.

FIG. 10b illustrates the state after implementation of the temperature equalization between the support shaft 4 and the components 5, 5' and the bearing receptacles 2. The support shaft 4 has reached its desired axial position. It has been heated, so that its diameter has increased. The component 5 is positioned in the axial direction such that it has been shrunk onto a small partial portion of the widened-diameter portion 7. As a consequence, the component 5 has been fixed in a releasable manner on the support shaft 4. The component 5 can then readily be pushed down from the partial portion of the widened-diameter portion 7, in order to adjust the desired angular position between the component 5 and the support shaft 4 before final pressing of the component 5 onto the support shaft 4. In a comparable manner, the component 5' is positioned in the axial direction such that it is shrunk onto the widened-diameter portion 7'. As a consequence, the component 5' is held in a releasably fixed manner on the support shaft 4. The component 5' can then be pushed down in a problem-free manner from the widened-diameter portion, in order to adjust the desired relative angular position between the support shaft 4, the inner shaft 20 (not illustrated) and the component 5'. In this way, the components 5 and 5' can be held in a releasably fixed manner on the support shaft 4 in a desired, previously known relative angular position. This facilitates the automation of the subsequent pressing of the components 5 onto the support shaft 4 or the subsequent pin connection between the component 5' and the inner shaft 20, not illustrated, (cf. FIG. 11) and the cycle time during assembly of the camshafts is increased.

FIG. 10c illustrates how the component 5 has been pushed down from the widened-diameter portion 7 in the arrow direction (arrow 25) with the temporary fixed arrangement released. In the same manner, the component 5' can be pushed down from the widened-diameter portion 7'.

After the component 5 has been pushed down from the widened-diameter portion 7, the desired relative angular position between the component 5 and the support shaft 4 is adjusted by rotation of the support shaft 4. This is indicated in FIG. 10d by the curved arrow 26 on the right-hand side. Then, the component 5 is pressed axially onto the widened-diameter portion 7 in the direction of the arrow 27, whereby a permanent press-fit connection in the form of a longitudinal interference fit assembly is formed between the component 5 and the support shaft 4. In addition, the press-fit connection can also be formed in a positive-locking manner.

In a similar manner, the component 5' can then be moved to its end position for the rotationally fixed connection to the inner shaft 20, not illustrated in FIGS. 10a-10d. For this purpose, the component 5' is first pushed down from the widened-diameter portion 7', so that the support shaft 4 can be freely rotated relative to the component 5'. Then, the support shaft 4 and the inner shaft 20, not illustrated, are rotated such that the opening 21, the first bore 22 in the inner shaft 20 (not illustrated) and the second bore 23 are aligned with one another in the component 5'. Then, a connection pin 24 is pressed through the opening 21 into the first bore 22 and the second bore 23, whereby the component 5' is connected in a rotationally fixed manner to the inner shaft 20. The component 5' can then be rotated relative to the support shaft 4 by rotation of the inner shaft 20.

The assembled state of the adjustable camshaft is illustrated in FIG. 11. The bearing receptacles 2 form sliding bearings for the support shaft 4. At the ends of the support shaft 4, the inner shaft 20 protrudes out of the support shaft 4. The component 5 is connected to the support shaft 4 by means of a non-positive-locking press-fit connection or a non-positive-locking and positive-locking press-fit connection. The shaft arrangement is illustrated in an axial half-section in the region of the component 5'. The hollow support shaft 4 surrounds the inner shaft 20. A connection pin 24 is pressed through the opening 21 (not visible in FIG. 11) in the support shaft 4 into the bore 22 of the inner shaft 20 and the bore 23 of the component 5'. An annular gap is present between the support shaft 4 and the inner shaft 20. The component 5' is connected to the inner shaft 20 in a rotationally fixed manner by means of the connection pin 24. The component 5' can be rotated relative to the support shaft 4 by rotating the inner shaft 20 relative to the support shaft 4. The widened-diameter portion 7, on which the component 5' was previously held in a releasably fixed manner, is shown in FIG. 11 on the right next to the component 5'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for assembling a module for a motor vehicle engine, which comprises at least one cylinder head cover with bearing receptacles and a camshaft mounted in the bearing receptacles, wherein the camshaft is constructed during assembly of the module from a support shaft and components that are to be connected to the support shaft, and wherein the components have through-openings configured to receive the support shaft, the method comprising the steps of:

a) providing a support shaft having local widened-diameter portions in regions in which the components are to be attached, and having bearing portions in regions in which the fully constructed camshaft is to be mounted in the bearing receptacles, wherein the widened-diameter portions have wider diameters than the bearing portions;

b) positioning the components, including a first component and a second component to be attached to the support shaft, in a predetermined sequence such that the through-openings of the components are disposed in a flush manner with respect to the bearing receptacles of the cylinder head cover, and are positioned at axial positions that do not correspond to axial positions occupied by the components on the fully constructed camshaft;

c) cooling the support shaft or heating the components in such a manner that the support shaft can be pushed with its widened-diameter portions and bearing portions through the bearing receptacles of the cylinder head cover and the through-openings of the components;

d) pushing the support shaft through the bearing receptacles and the through-openings in such a manner that a bearing portion of the support shaft is disposed in each bearing receptacle and a widened-diameter portion is disposed adjacent to each component;

e) heating the support shaft or cooling the components in such a manner that the widened-diameter portions of the support shaft and the through-openings of the components allocated to the widened-diameter portions has a predetermined overlap;

f) consecutively pressing the components onto the widened-diameter portions allocated to them or consecutively pressing the widened-diameter portions into the through-openings of the components allocated to them;

g) for the first component, rotating the support shaft to a first specific angular position relative to the first component, wherein the rotating occurs prior to the pressing step for the first component and subsequent to the positioning step; and h) for the second component, rotating the support shaft to a second specific angular position relative to the second component from the first specific angular position, wherein the rotating occurs prior to the pressing step for the second component and subsequent to the positioning step.

2. The method as claimed in claim 1, wherein the widened-diameter portions are introduced into the support shaft by means of a mechanical forming method.

3. The method as claimed in claim 2, wherein the mechanical forming method is roller-burnishing.

4. The method as claimed in claim 1, wherein the bearing receptacles of the cylinder head cover and the bearing portions of the support shaft are dimensioned such that in the fully mounted state of the cylinder head cover the bearing receptacles together with the bearing portions form sliding bearings.

5. The method as claimed in claim 1, wherein in method step b) the components are positioned such that after temperature equalization in method step e) between the support shaft and the components, the components are held in a releasably fixed manner on a respective partial portion of the widened-diameter portions.

6. The method as claimed in claim 1, wherein the support shaft is a hollow shaft with an inner shaft is disposed concentrically with respect to the hollow shaft in an interior of the hollow shaft, wherein the inner shaft can be rotated relative to the hollow shaft, and after temperature equalization in accordance with method step e) at least one component is provided that is not connected to the support shaft but which is connected in a rotationally fixed manner to the inner shaft.

7. The method as claimed in claim 6, wherein the component is connected to the inner shaft by a pin connection, wherein an opening is provided in the support shaft formed as a hollow shaft, a first bore is provided in the inner shaft and a second bore is provided in the component, wherein the opening, the first bore and the second bore are positioned so as to be flush with one another, and wherein a connection pin is pressed through the opening into the first bore and into the second bore.

* * * * *

UNITED STATES PATENT AND TRADEMARK OFFICE
CERTIFICATE OF CORRECTION

PATENT NO.         : 10,046,425 B2
APPLICATION NO.    : 13/821265
DATED              : August 14, 2018
INVENTOR(S)        : Michael Walter et al.

Page 1 of 1

It is certified that error appears in the above-identified patent and that said Letters Patent is hereby corrected as shown below:

On the Title Page

Column 1, item (73) should read:
(73) Assignee: ThyssenKrupp Presta TecCenter AG, Eschen (LI)

Signed and Sealed this
Sixteenth Day of April, 2019

Andrei Iancu
*Director of the United States Patent and Trademark Office*